May 7, 1968   J. DIGARD BROU DE CUISSART ETAL   3,381,361
MANUFACTURE OF BELLOWS-TYPE SEALS
Filed Dec. 7, 1965                                                     2 Sheets-Sheet 1

INVENTORS
JEAN DIGARD BROU DE CUISSART
GASPARD DREYFUS
ROGER LECLUSE
BY
Bacon & Thomas ATTORNEYS INVENTORS
JEAN DIGARD BROU DE CUISSART
GASPARD DREYFUS
ROGER LECLUSE
BY
Bacon & Thomas ATTORNEYS 3,381,361
MANUFACTURE OF BELLOWS-TYPE SEALS
Jean Digard Brou De Cuissart, Paris, Gaspard Dreyfus, Fresnes, and Roger Lecluse, Fontenay-aux-Roses, France, assignors to Commissariat à l'Energie Atomique, Paris, France
Filed Dec. 7, 1965, Ser. No. 512,116
Claims priority, application France, Dec. 29, 1964, 236
4 Claims. (Cl. 29—423)

The present invention relates to a method of manufacture of bellows-type seals, particularly with a view to forming expansion joints between two parts which are designed to carry out relative longitudinal movements along the common axis thereof.

The absolute leak-tightness which is required by certain applications entails the use of bellows-sealed expansion joints. Unfortunately, the bellows employed up to the present time have the disadvantage of being subject to rapid wear, which is especially the case when they are subjected to severe operating conditions (temperature, pressure, elongation and frequency of movements, etc.), and which is mainly due both to faulty manufacture and to the method of fitting said bellows in expansion-joint assemblies.

This invention is directed to the practical application of a method of manufacture of bellows for expansion joints whereby said bellows are designed to meet practical requirements in a more effective manner than has been possible heretofore, especially insofar as said method makes it possible to extend the service life of the bellows under severe operating conditions.

To this end, the invention proposes a method of manufacture of bellows by machining, said method consisting in centering a tubular workpiece on a mandrel, in cutting circular grooves in that cylindrical face of the workpiece which is not in contact with the mandrel, in centering the bellows by means of a part which engages in the grooves formed in the first cylindrical face, and in machining grooves in the other cylindrical face between the grooves of the first face after removal of the mandrel.

The invention will be more readily understood from a perusal of the following description of preferred forms of embodiment of the invention which are given by way of example and not in any limiting sense, reference being made to the accompanying drawings in which.

Figures 3, 4:
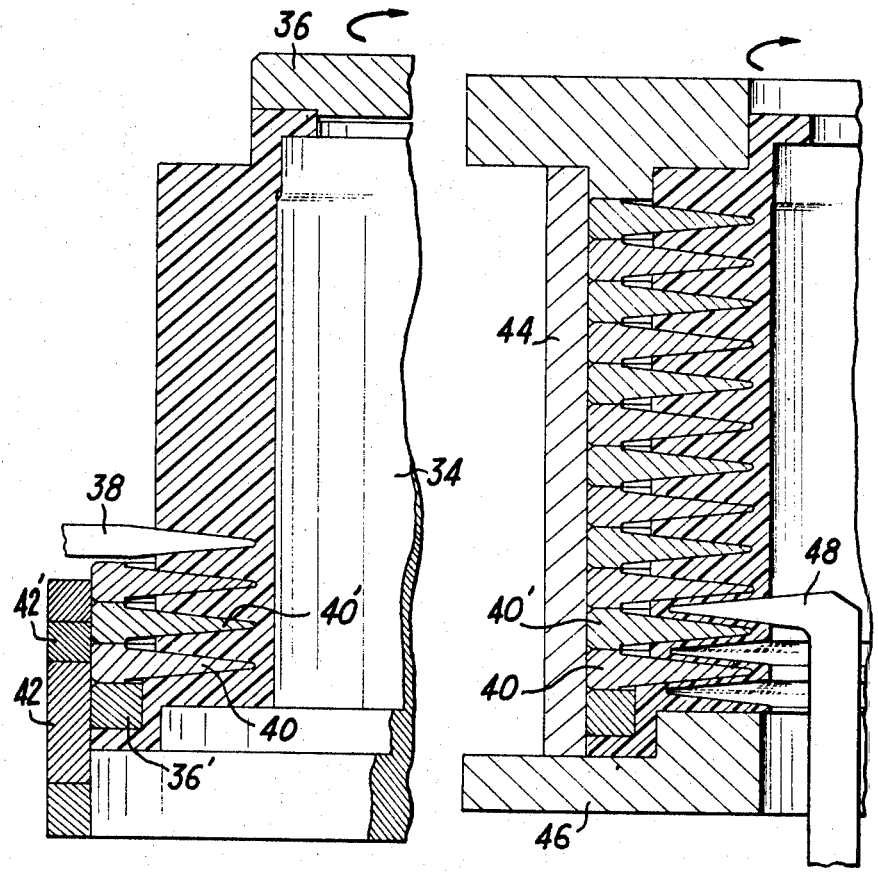
FIG. 3 is a view in cross-section taken along the axis of the bellows and shows the method of machining the outer face of the bellows.

FIG. 4, which is similar to FIG. 3, shows the method of machining the inner face of the bellows.

Figure 1:
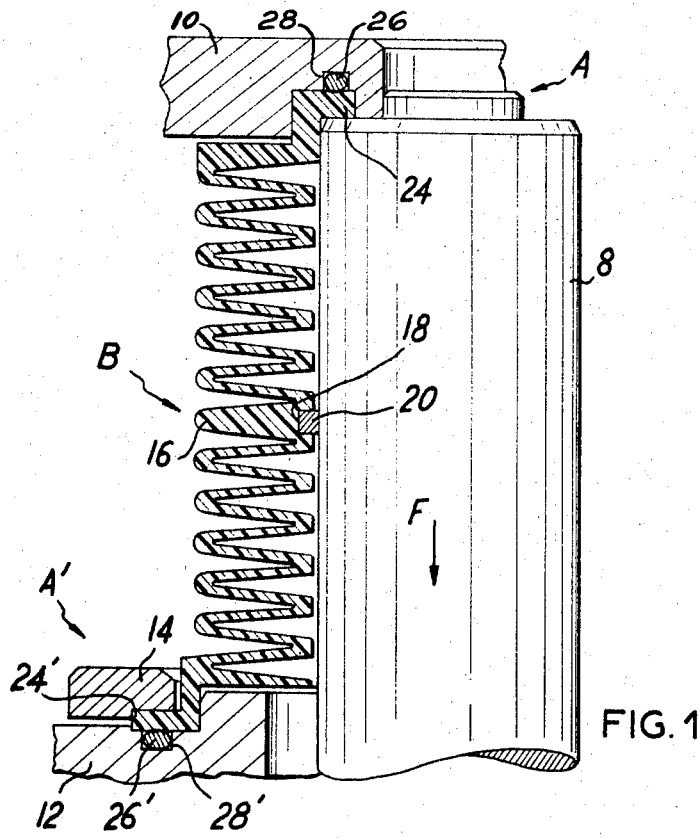
FIG. 1 shows an expansion joint fitted with a bellows in accordance with the invention, as shown in cross-section along a plane which passes through the axis of the bellows.

This invention makes it possible to construct bellows for expansion joints or seals such as the seal shown in FIG. 1, with a view to providing a leak-tight connection between two assemblies which are longitudinally movable with respect to each other. The first assembly, which is designated by the reference A, comprises a core 8 and an annular member 10 which is attached to the core by means such as screws (not shown). The second assembly A' consists of a member 12 through which the core 8 passes and of a ring 14 which is secured to the member 12 by means which have not been shown in the drawings.

Figure 2:
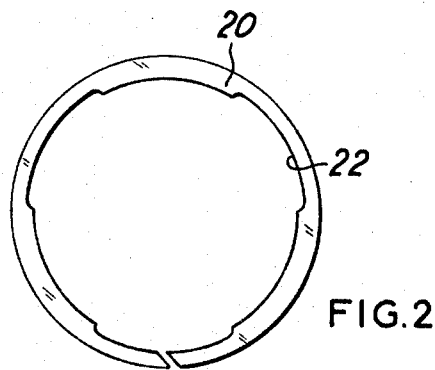
FIG. 2 is a plan view of a sealing ring which forms part of the expansion joint of FIG. 1.

Leak-tightness of the connection between the two assemblies A and A' is ensured by means of a bellows B, the axis of which is parallel to the direction of displacement f. Said bellows is essentially made up of a membrane of flexible material which is of constant thickness over the major part of its development. The material is chosen according to the nature of the fluid which is in contact therewith. Polytetrafluoroethylene is often used. The bellows is provided with a dummy pleat 16 of appreciable thickness formed by a zone inside said bellows which has not been machined, and with a circular channel 18 which is cut in said dummy pleat opposite to the core 8. There is fitted within said channel a guide ring 20 (as shown in FIGS. 1 and 2). In order that said guide ring may be inserted and locked by expansion in the channel 18, the internal diameter of said ring is preferably such as to permit this latter to slide with slight friction over the core 8 and thus to guide the central portion of the bellows B. The guide ring can be formed of any suitable friction material such as sintered bronze, charged polytetrafluoroethylene, carbon and so forth.

In order to prevent fluid from being imprisoned between the top portion of the bellows B and the core 8, the ring 20 is provided with recessed portions such as 22.

The bellows is provided at the ends thereof with annular fastening flanges 24 and 24' (as shown in FIG. 1). One of said annular flanges is imprisoned between the core 8 and the member 10; the second annular flange is imprisoned between the member 12 and the ring 14. In each case, leak-tightness of the joint is ensured by means of an O-ring seal 26 or 26' which is fitted within a channel 28 or 28', the transverse cross-sectional area of which is slightly smaller than that of the seal which is fitted therein. At the time of assembly, the seal 26 or 26' deforms the corresponding annular flange 24 or 24' and ensures absolute leak-tightness.

The method of machining in accordance with the invention makes it possible to endow the bellows with satisfactory uniformity both in shape and thickness of wall by virtue of the fact that it is guided with accuracy during operation.

The tubular workpiece which is employed for the manufacture of the bellows is fitted over a mandrel 34 (as shown in FIG. 3) and clamped thereon by means of a plate 36. A first circular pleat groove is machined in the base of the workpiece by means of a conventional tool 38. Before proceeding to machine the following circular groove, two half-washers such as 40 are inserted in the groove which has just been completed in order to retain the shape of this latter, and are locked in position by means of a bushing 42 which reaches the mid-height of said half-washers. The following groove is then machined and is in turn supported by means of two half-washers 40' which are retained by a bushing 42' and so forth in sequence until the entire outer face of the bellows has been machined.

Before proceeding to machine the inner face of the bellows, the bushing 42 and rings 42', etc . . . are replaced by a single tube 44, as shown in FIG. 3.

The complete assembly is placed over another mandrel 46 and the internal machining operation is carried out by means of a second tool 48 or even the same tool disposed in a different manner, as shown in FIG. 4. The dummy pleats are formed by omitting to machine one groove between two outer grooves.

The method which has just been described ensures high precision both in the shape and thickness of the pleats and also does not give rise to any weak points which accelerate the wear of the bellows. In particular, the order of operations can be reversed (the internal machining operation being performed prior to the external machining operation) although the order as hereinabove described is usually preferable.

What we claim is:

1. Method of manufacture of bellows, said method comprising centering a tubular workpiece on a mandrel, cutting circular grooves in that cylindrical face of the workpiece which is not in contact with the mandrel, removing said mandrel from said grooved tubular workpiece, centering the bellows by means of a part which engages in the grooves formed in the first cylindrical face, and machining grooves in the other cylindrical face between the grooves of the first face after removal of the mandrel.

2. Method in accordance with claim 1, including disposing a rigid washer within each groove after said groove has been machined and prior to machining of the following groove.

3. Method in accordance with claim 2 including omitting one groove in one face between two grooves of the other face to form a dummy pleat.

4. Method in accordance with claim 3, including machining a groove of smaller depth than the pleat grooves in the dummy pleat with a view to accommodating a centering ring.

References Cited

UNITED STATES PATENTS

| 1,926,628 | 9/1933 | Morehouse. |
| 2,175,596 | 10/1939 | Erling _____ 83—54 X |
| 2,304,828 | 12/1942 | Joy. |

FOREIGN PATENTS

| 820,544 | 9/1959 | Great Britain. |

CHARLIE T. MOON, *Primary Examiner.*